United States Patent
Han et al.

(10) Patent No.: US 11,629,909 B2
(45) Date of Patent: Apr. 18, 2023

(54) ARTIFICIAL INTELLIGENT REFRIGERATOR

(71) Applicant: LG ELECTRONICS INC., Seoul (KR)

(72) Inventors: Junsoo Han, Seoul (KR); Younghun Yang, Seoul (KR); Yonghwan Eom, Seoul (KR); Junseong Jeong, Seoul (KR); Cholok Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

(21) Appl. No.: 16/687,595

(22) Filed: Nov. 18, 2019

(65) Prior Publication Data

US 2020/0080769 A1    Mar. 12, 2020

(30) Foreign Application Priority Data

Aug. 5, 2019    (KR) .......................... 10-2019-0095184

(51) Int. Cl.
*F25D 29/00* (2006.01)
*F25D 11/02* (2006.01)
(Continued)

(52) U.S. Cl.
CPC .......... *F25D 29/003* (2013.01); *F25D 11/022* (2013.01); *F25D 17/065* (2013.01);
(Continued)

(58) Field of Classification Search
CPC combination set(s) only.
See application file for complete search history.

(56) References Cited

U.S. PATENT DOCUMENTS

| 2007/0227161 A1* | 10/2007 | Boer | F25D 29/00 |
| | | | 62/56 |
| 2008/0149655 A1* | 6/2008 | Gist | A23G 9/281 |
| | | | 221/150 R |

(Continued)

OTHER PUBLICATIONS

JP 04-363532 (English Abstract) (Year: 1992).*

*Primary Examiner* — Jonathan Bradford
(74) *Attorney, Agent, or Firm* — Lee Hong Degerman Kang Waimey

(57) ABSTRACT

An artificial intelligent refrigerator is disclosed. The artificial intelligent refrigerator includes: one or more first temperature sensor that senses refrigerating compartment-internal temperature in a refrigerating compartment of the refrigerator; one or more second temperature sensor that senses freezing compartment-internal temperature in a freezing compartment of the refrigerator; and a refrigerator processor that calculates a load accumulation amount for food put in the refrigerator on the basis of the refrigerating compartment-internal temperature or the freezing compartment-internal temperature, and performs a load correspondence operation using the calculated load accumulation amount. According to the artificial intelligent refrigerator of the present disclosure, one or more of a user terminal, and a server of the present disclosure may be associated with an artificial intelligence module, a drone ((Unmanned Aerial Vehicle, UAV), a robot, an AR (Augmented Reality) device, a VR (Virtual Reality) device, a device associated with 5G services, etc.

11 Claims, 13 Drawing Sheets

| Step | 1 | 2 | 3 | 4 | 5 | 6 | 7 | 8 | 9 | 10 |
|---|---|---|---|---|---|---|---|---|---|---|
| LOAD CHANGE ACCUMULATION AMOUNT | 10% | 20% | 30% | 40% | 50% | 60% | 70% | 80% | 90% | 100% |
| EXTERNAL AIR TEMPERATURE (GUARANTEE CONDITION) | 5~43 DEGREES ||||||||||
| LOAD CORRESPONDENCE — COOLING ABILITY | 90% OF BASIC COOLING ABILITY ||| BASIC COOLING ABILITY ||| 105% OF BASIC COOLING ABILITY || 110% OF BASIC COOLING ABILITY ||
| LOAD CORRESPONDENCE — Fan | MEDIUM SPEED |||||||| HIGH SPEED ||

(51) Int. Cl.
*F25D 17/06* (2006.01)
*G06N 5/02* (2023.01)

(52) U.S. Cl.
CPC ........... *F25D 17/067* (2013.01); *F25D 29/00* (2013.01); *G06N 5/02* (2013.01); *F25D 2317/061* (2013.01); *F25D 2400/34* (2013.01); *F25D 2500/04* (2013.01); *F25D 2500/06* (2013.01); *F25D 2700/12* (2013.01); *F25D 2700/121* (2013.01); *F25D 2700/122* (2013.01); *F25D 2700/14* (2013.01)

(56) References Cited

U.S. PATENT DOCUMENTS

| | | | |
|---|---|---|---|
| 2010/0152902 A1* | 6/2010 | Sung | F25D 17/065 |
| | | | 700/275 |
| 2016/0313054 A1* | 10/2016 | Chung | F25D 29/00 |
| 2018/0106532 A1* | 4/2018 | Sugar | F25D 29/008 |
| 2018/0376534 A1* | 12/2018 | Mustafic | H04W 92/02 |
| 2019/0068268 A1* | 2/2019 | Zhang | H04B 7/0639 |
| 2019/0170404 A1* | 6/2019 | Chretien | F25B 27/00 |

* cited by examiner

FIG. 13

| Step | | 1 | 2 | 3 | 4 | 5 | 6 | 7 | 8 | 9 | 10 |
|---|---|---|---|---|---|---|---|---|---|---|---|
| LOAD CHANGE ACCUMULATION AMOUNT | | 10% | 20% | 30% | 40% | 50% | 60% | 70% | 80% | 90% | 100% |
| EXTERNAL AIR TEMPERATURE (GUARANTEE CONDITION) | | 5~43 DEGREES | | | | | | | | | |
| LOAD CORRESPONDENCE | COOLING ABILITY | 90% OF BASIC COOLING ABILITY | | | BASIC COOLING ABILITY | | | 105% OF BASIC COOLING ABILITY | | 110% OF BASIC COOLING ABILITY | |
| | Fan | MEDIUM SPEED | | | | | | | | HIGH SPEED | |

ARTIFICIAL INTELLIGENT REFRIGERATOR

CROSS-REFERENCE TO RELATED APPLICATIONS

Pursuant to 35 U.S.C. § 119(a), this application claims the benefit of earlier filing date and right of priority to Korean Patent Application No. 10-2019-0095184, filed on Aug. 5, 2019, the contents of which are hereby incorporated by reference herein in its entirety.

BACKGROUND OF THE INVENTION

Field of the Invention

The present disclosure relates to an artificial intelligent refrigerator that can estimate a temperature variation of a refrigerating compartment or a temperature variation of a freezing compartment in accordance with an artificial intelligent learning result, and can perform a load correspondence operation on the basis of the estimation.

Related Art

In general, a refrigerator, which is an apparatus that is used for keeping stored objects such as food and drink fresh for a long period of time, keeps objects frozen or cool, depending on the kinds of objects to be stored.

A refrigerator is operated by driving of a compressor disposed therein. Cold air that is supplied into a refrigerator is generated by a heat exchange process of a refrigerant and is continuously supplied into the refrigerator through a repeatedly performed cycle of compression-condensation-expansion-evaporation, and the supplied refrigerant uniformly transfers in the refrigerator by convection, whereby food is kept at a desired temperature in the refrigerator. The cycle depends on the configuration of the refrigeration cycle system in refrigerators.

In general, a refrigerator performs a load correspondence operation in accordance with a change in load. Refrigerators and control methods thereof according to related art perform a load correspondence operation by inputting load correspondence simply when the temperature in the refrigerators increases to a predetermined temperature or more after a door of a refrigerating compartment or a freezing compartment is opened and closed; therefore, there is a problem in that they cannot accurately give notice of a point in time of a load correspondence operation in accordance with the position, performance, etc. of a temperature sensor.

SUMMARY OF THE INVENTION

An object of the present disclosure is to solve the problems described above.

Further, an object of the present disclosure is to provide an artificial intelligent refrigerator that can estimate a variation of refrigerating compartment temperature or a variation of freezing compartment temperature in accordance with an artificial intelligent learning result, and can perform a load correspondence operation on the basis of the estimation.

An artificial intelligent refrigerator according to an embodiment of the present disclosure includes: one or more first temperature sensor that senses refrigerating compartment-internal temperature in a refrigerating compartment of the refrigerator; one or more second temperature sensor that senses freezing compartment-internal temperature in a freezing compartment of the refrigerator; and a refrigerator processor that calculates a load accumulation amount for food put in the refrigerator on the basis of the refrigerating compartment-internal temperature or the freezing compartment-internal temperature, and performs a load correspondence operation using the calculated load accumulation amount.

Further, the artificial intelligent refrigerator may include: a first compressing unit and a second compressing unit that are connected to compress a refrigerant at least one time; a condensing unit that is connected to a discharge side of the second compressing unit positioned downstream in a flow direction of the refrigerant; a first evaporating unit that diverges from the condensing unit and is connected to an intake side of the first compressing unit positioned upstream in the flow direction of the refrigerant; a second evaporating unit that diverges from the condensing unit together with the first evaporating unit and is connected between a discharge side of the first compressing unit and an intake side of the second compressing unit; and a refrigerant switch valve that is installed at a point diverting from an outlet side of the condensing unit to the first evaporating unit and the second evaporating unit, and controls the flow direction of the refrigerant.

Further, the refrigerator processor may include: a first calculator that calculates a variation of the refrigerating compartment-internal temperature at every time period; and a second calculator that calculates a variation of the freezing compartment-internal temperature at every time period.

Further, the artificial intelligent refrigerator may further include a memory that stores a variation of the refrigerating compartment-internal temperature and a variation of the freezing compartment-internal temperature.

Further, the refrigerator processor may maintain a current cooling ability value of the compressing units when a variation of the refrigerating compartment-internal temperature or a variation of the freezing compartment-internal temperature is a pre-set reference variation or more in initial starting.

Further, the refrigerator processor may increase a current cooling ability value of the compressing units when a variation of the refrigerating compartment-internal temperature or a variation of the freezing compartment-internal temperature is a pre-set reference variation or less in initial starting.

Further, the refrigerator processor may calculate the load accumulation amount by learning a variation of the refrigerating compartment-internal temperature, a variation of the freezing compartment-internal temperature, external air temperature/humidity of the refrigerator, and an operation state of the refrigerator, and may set a step range of the calculated load accumulation amount.

Further, the refrigerator processor may set the step range of the load accumulation amount and may make a cooling ability value of load correspondence different in accordance with the set step range of the load accumulation amount.

Further, a thermal capacity of food or a thermal load required for cooling based on an external air environment condition may be added to the load accumulation amount.

Further, the refrigerator processor may receive a DCI (Downlink Control Information), which is used to schedule transmission of temperature information sensed by the artificial intelligent refrigerator, from a network, and the sensed temperature information may be transmitted to the network on the basis of the DCI.

Further, the refrigerator processor may perform a procedure of initial connection with the network on the basis of an SSB (Synchronization signal block), the sensed temperature information may be transmitted to the network through a PUSCH, and DM-RS of the SSB and the PUSCH may have undergone QCL for a QCL type D.

BRIEF DESCRIPTION OF THE DRAWINGS

FIG. 13 shows setting a load accumulation amount step range according to an embodiment of the present disclosure.

The accompanying drawings included as a part of the detailed description to assist in understanding the present disclosure provide embodiments of the present disclosure and describe technical features of the present disclosure together with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
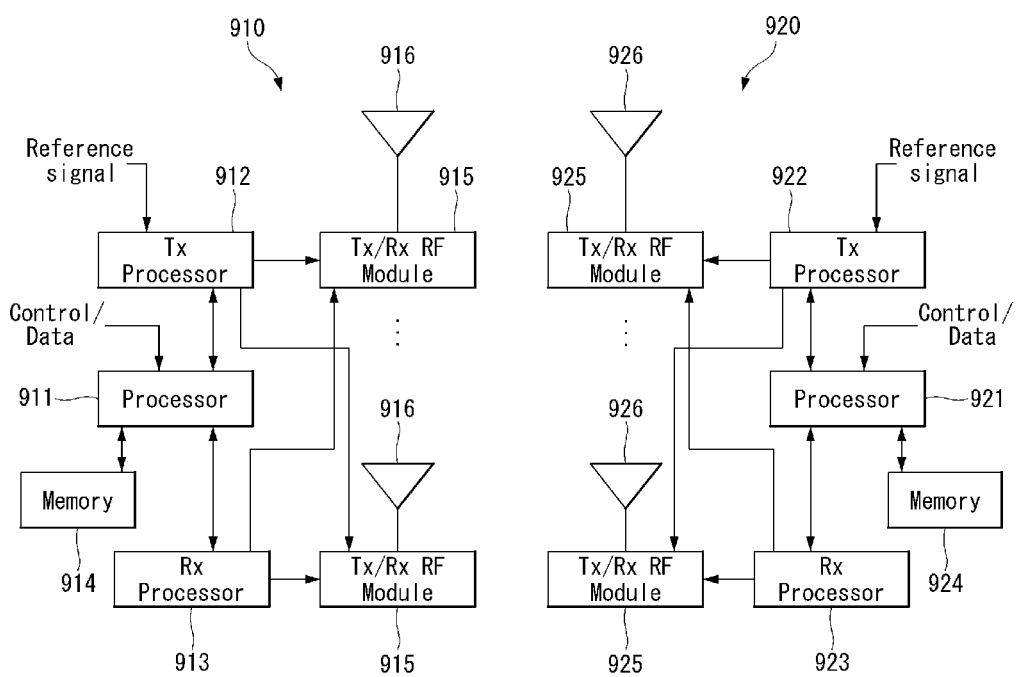
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
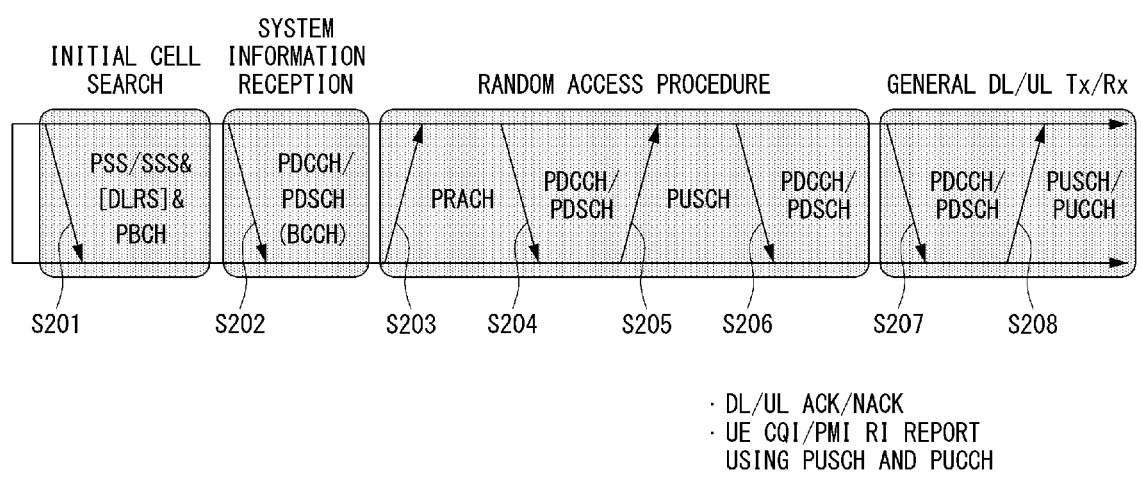
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
  - When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Intelligent Refrigerators Using 5G Communication

Figure 3:
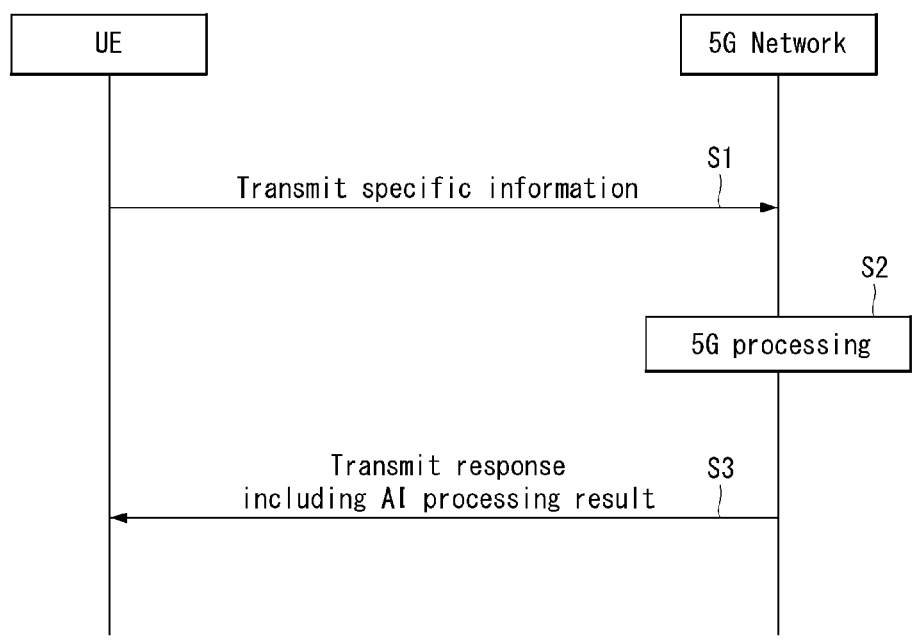
FIG. 3 shows an example of basic operations of a user equipment and a 5G network in a 5G communication system.

FIG. 3 shows an example of basic operations of an intelligent refrigerator and a 5G network in a 5G communication system.

The intelligent refrigerator transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the intelligent refrigerator (S3).

G. Applied Operations Between Intelligent Refrigerator and 5G Network in 5G Communication System Hereinafter, the operation of an intelligent refrigerator using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the intelligent refrigerator performs an initial access procedure and a random access procedure with the 5G network prior to step S1 of FIG. 3 in order to transmit/receive signals, information and the like to/from the 5G network.

More specifically, the intelligent refrigerator performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the intelligent refrigerator receives a signal from the 5G network.

In addition, the intelligent refrigerator performs a random access procedure with the 5G network for UL synchronization acquisition and/or UL transmission. The 5G network can transmit, to the intelligent refrigerator, a UL grant for scheduling transmission of specific information. Accordingly, the intelligent refrigerator transmits the specific information to the 5G network on the basis of the UL grant. In addition, the 5G network transmits, to the intelligent refrigerator, a DL grant for scheduling transmission of 5G processing results with respect to the specific information. Accordingly, the 5G network can transmit, to the intelligent refrigerator, information (or a signal) related to remote control on the basis of the DL grant.

Next, a basic procedure of an applied operation to which a method proposed by the present disclosure which will be described later and URLLC of 5G communication are applied will be described.

As described above, an intelligent refrigerator can receive DownlinkPreemption IE from the 5G network after the intelligent refrigerator performs an initial access procedure and/or a random access procedure with the 5G network. Then, the intelligent refrigerator receives DCI format 2_1 including a preemption indication from the 5G network on the basis of DownlinkPreemption IE. The intelligent refrigerator does not perform (or expect or assume) reception of eMBB data in resources (PRBs and/or OFDM symbols) indicated by the preemption indication. Thereafter, when the intelligent refrigerator needs to transmit specific information, the intelligent refrigerator can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the intelligent refrigerator receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the intelligent refrigerator transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
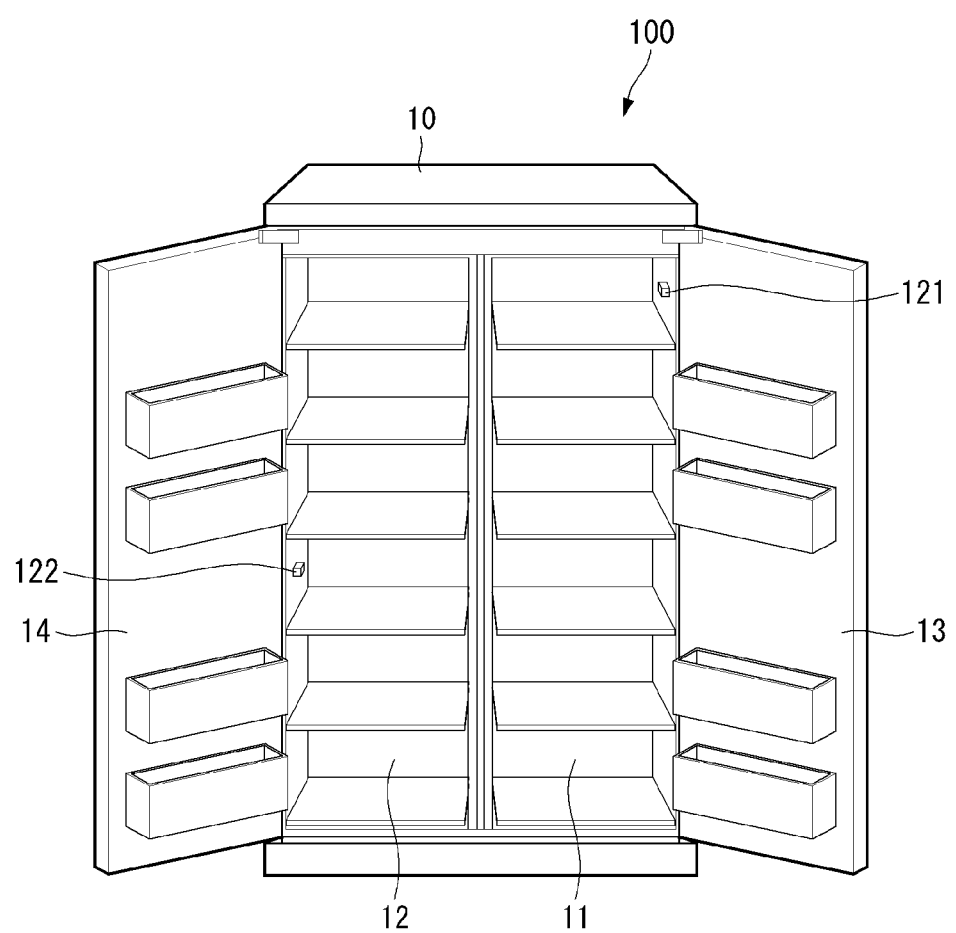
FIG. 4 is a diagram illustrating an artificial intelligent refrigerator according to an embodiment of the present disclosure.

FIG. 4 is a diagram illustrating an artificial intelligent refrigerator according to an embodiment of the present disclosure.

Referring to FIG. 4, an artificial intelligent refrigerator 100 according to an embodiment of the present disclosure may include: a refrigerator main body 10 having a refrigerating compartment 11 and a freezing compartment 12; and a refrigerating compartment door 13 and a freezing compartment door 14 opening/closing the refrigerating compartment 11 and the freezing compartment 12 of the refrigerator main body 10. The artificial intelligent refrigerator 100 may include a refrigerating compartment temperature sensor 121 that senses temperature in the refrigerating compartment 11 and a freezing compartment temperature sensor 122 that senses temperature in the freezing compartment 12.

At least one or more refrigerating compartment temperature sensors 121 may be disposed in the refrigerating compartment 11. The refrigerating compartment temperature sensors 121 may be spaced apart from each other. The refrigerating compartment temperature sensor 121 may be referred to as a first temperature sensor 121.

At least one or more freezing compartment temperature sensor 122 may be disposed in the freezing compartment 12. The freezing compartment temperature sensors 122 may be spaced apart from each other. The freezing compartment temperature sensor 122 may be referred to as a second temperature sensor 122.

Further, the artificial intelligent refrigerator 100, though not shown, may include a refrigerator processor (not shown) electrically connected with the refrigerating compartment temperature sensor 121 and the freezing compartment temperature sensor 122.

Figure 5:
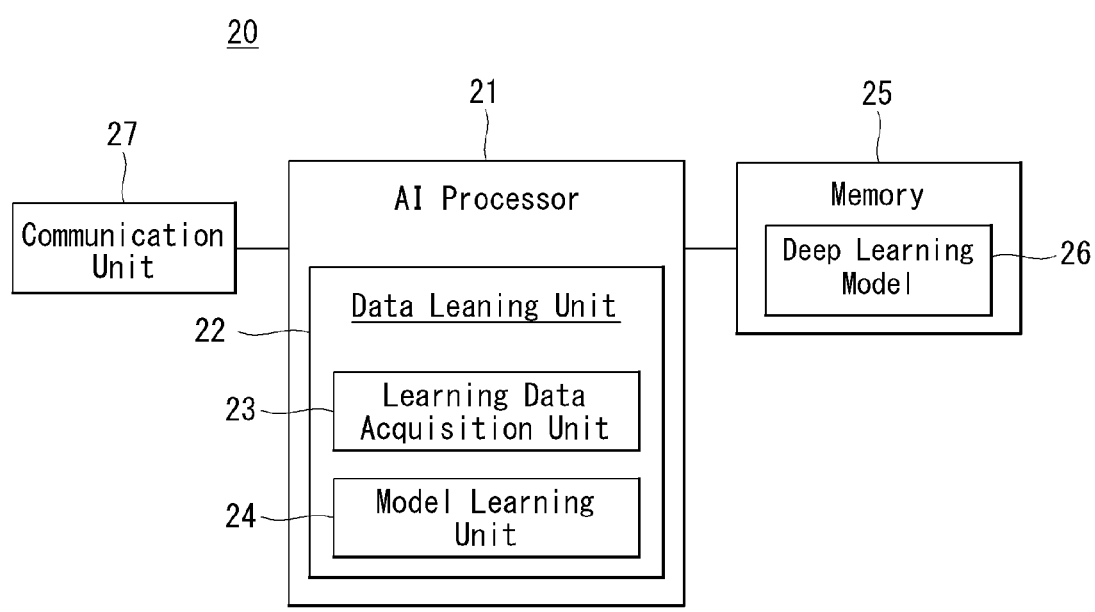
FIG. 5 is a block diagram of an AI device according to an embodiment of the present disclosure.

FIG. 5 is a block diagram of an AI device according to an embodiment of the present disclosure.

An AI device 20 may include an electronic device including an AI module that can perform AI processing, a server including the AI module, or the like. Further, the AI device 20 may be included as at least one component of the intelligent refrigerator 100 shown in FIG. 4 to perform together at least a portion of the AI processing.

The AI processing may include all operations related to driving of the intelligent refrigerator 100 shown in FIG. 4.

For example, the artificial intelligent refrigerator 100 can perform operations of processing/determining, and control signal generating by performing AI processing on sensing data. Further, for example, the artificial intelligent refrigerator 100 can control the internal temperature of the refrigerating compartment or the internal temperature of the freezing compartment by performing AI processing on data acquired through interaction with another electronic device disposed in the refrigerator.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to internal temperature of the artificial intelligent refrigerator 100. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, internal temperature data of the refrigerating compartment, internal temperature data of the freezing compartment, and/or external temperature data of the artificial intelligent refrigerator to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selecting unit can select only data about an object included in a specific period as learning data by performing detection for the specific period on data acquired through the internal temperature data of the refrigerating compartment, internal temperature data of the freezing compartment, and/or external temperature data of the artificial intelligent refrigerator.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an intelligent refrigerator. Further, the AI device 20 may be defined as another vehicle or a 5G network that communicates with the intelligent refrigerator. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 6:
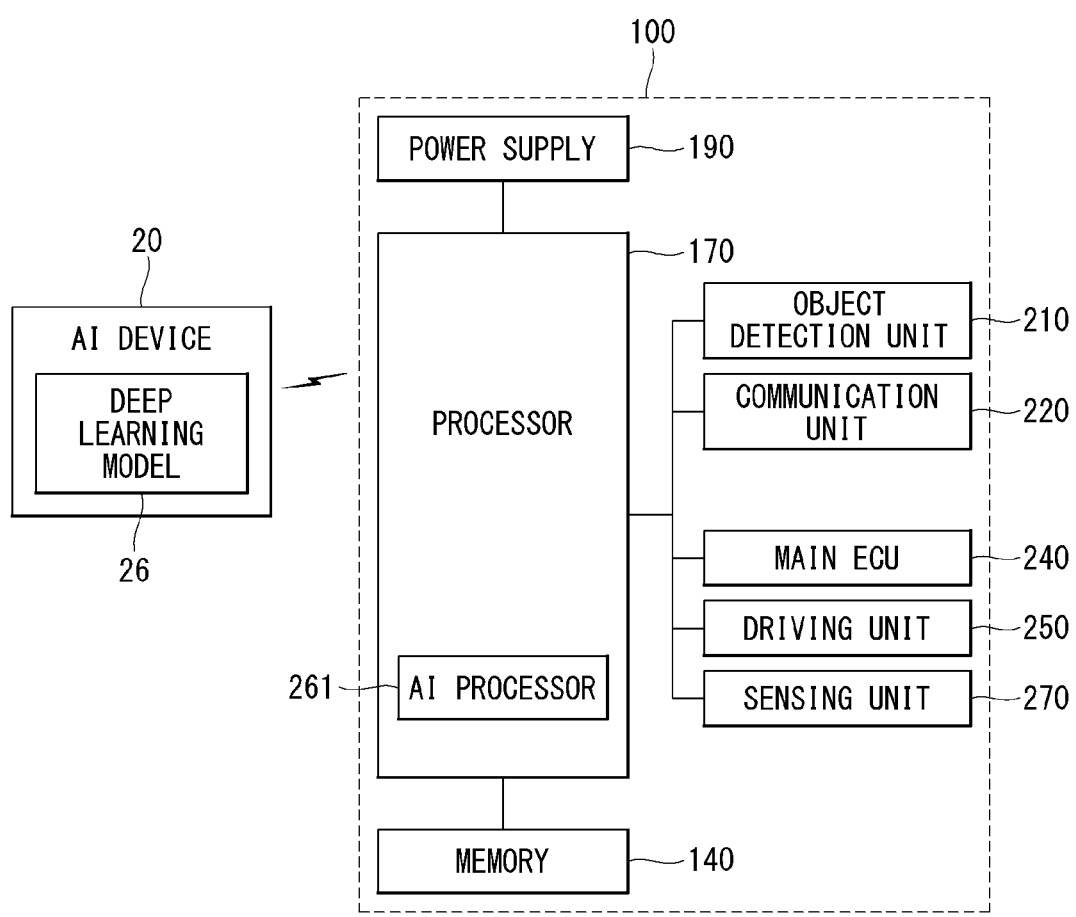
FIG. 6 is a diagram illustrating a system in which an artificial intelligent refrigerator and an AI device according to an embodiment of the present disclosure are linked.

FIG. 6 is a diagram illustrating a system in which an artificial intelligent refrigerator and an AI device according to an embodiment of the present disclosure are linked.

Referring to FIG. 6, an artificial intelligent refrigerator 100 can transmit data that require AI processing to an AI device 20 through a communication unit and the AI device 20 including a neural network model 26 can transmit an AI processing result using the neural network model 26 to the artificial intelligent refrigerator 100. The description of FIG. 5 can be referred to for the AI device 20.

The artificial intelligent refrigerator 100 may include a memory 140, a processor 170, and a power supply 190 and the processor 170 may further include an AI processor 261. Further, the artificial intelligent refrigerator 100 may include an interface that is connected with at least one electronic device included in the refrigerator in a wired or wireless manner and can exchange data for driving or internal temperature control of the refrigerator. At least one electronic device connected through the interface may include an object detection unit 210, a communication unit 220, a main ECU 240, a driving unit 250, and a sensing unit 270.

The interface can be configured using at least one of a communication module, a terminal, a pin, a cable, a port, a circuit, an element and a device.

The memory 140 is electrically connected with the processor 170. The memory 140 can store basic data about units, control data for operation control of units, and input/output data. The memory 140 can store data processed in the processor 170. Hardware-wise, the memory 140 may be configured using at least one of a ROM, a RAM, an EPROM, a flash drive, and a hard drive. The memory 140 can store various types of data for the overall operation of the artificial intelligent refrigerator 100, such as a program for processing or control of the processor 170. For example, the memory 140 can store a variation of refrigerating compartment temperature and a variation of freezing compartment temperature.

The memory 140 may be integrated with the processor 170. Depending on embodiments, the memory 140 may be classified as a lower configuration of the processor 170.

The power supply 190 can supply power to the artificial intelligent refrigerator 100. The power supply 190 can be supplied with power from a power source included in the artificial intelligent refrigerator 100 and can supply power to every units of the artificial intelligent refrigerator 100. The power supply 190 can operate in accordance with a control signal supplied from the main ECU 240. The power supply 190 may include a switched-mode power supply (SMPS).

The processor 170 can be electrically connected to the memory 140, the interface, and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal, and provide the signal while power is supplied thereto by the power supply 190.

The processor 170 can receive information from other electronic devices included in the artificial intelligent refrigerator 100 through the interface. The processor 170 can provide control signals to other electronic devices included in the artificial intelligent refrigerator 100 through the interface.

The processor 170 can perform a normal operation that maintains the internal temperature of the refrigerating compartment or the internal temperature of the freezing compartment at predetermined temperature, or perform a load correspondence operation on the basis of a variation of the internal temperature of the refrigerating compartment or a variation of the internal temperature of the freezing compartment according to a predetermined time period. The processor may be referred to as a refrigerator processor 170 or a refrigerator control unit 170. The load correspondence operation, unlike the normal operation, is an operation manner that makes the artificial intelligent refrigerator 100 operate in a normal state by increasing or decreasing a cooling ability in accordance with a load change.

The artificial intelligent refrigerator 100 may include at least one printed circuit board (PCB). The memory 140, the interface, the power supply 190, and the processor 170 may be electrically connected to the PCB.

Hereafter, other electronic devices connected with the interface and included in the artificial intelligent refrigerator, and the AI processor 261 will be described in more detail. Hereafter, for the convenience of description, the artificial intelligent refrigerator 100 is referred to as a refrigerator 100.

First, the object detection unit 210 can generate information on objects outside the refrigerator 100. The AI processor 261 can generate at least one of on presence or absence of an object, positional information of the object, and information on a distance between the refrigerator 100 and the object by applying a neural network model to data acquired through the object detection unit 210.

The object detection unit 210 may include at least one sensor that can detect objects disposed or moving around the artificial intelligent refrigerator 100. The sensor may include a camera, a temperature sensor, an ultrasonic sensor, and an infrared sensor. The object detection unit 210 can provide data about an object generated on the basis of a sensing signal generated from a sensor to at least one electronic device included in the refrigerator 100.

Meanwhile, the refrigerator 100 transmits the sensing data acquired through at least one sensor to the AI device 20 through the communication unit 220 and the AI device 20 can transmit AI processing data generated by applying the neural network model 26 to the transmitted data to the refrigerator 100. The refrigerator 100 can recognize information about a detected object on the basis of the received AI processing data and can perform an overall control operation for a door state of the refrigerator, the internal temperature of the refrigerator, and the refrigerator using the recognized information.

The communication unit 220 can exchange signals with devices disposed outside the refrigerator 100. The communication unit 220 can exchange signals with at least any one of an infrastructure (e.g., a server and a broadcast station), a smart device, or a smart terminal. The communication device 220 may include a transmission antenna, a reception antenna, and at least one of a radio frequency (RF) circuit and an RF element which can implement various communication protocols in order to perform communication.

The main ECU 240 can control the overall operation of at least one electronic device included in the refrigerator 100.

The driving unit 250 is a device for electrically controlling various driving devices included in the refrigerator 100. For example, the driving unit 250 can control a compressor, an evaporator, and a condenser. The driving unit 250 may include at least one electronic control device (e.g., a control ECU (Electronic Control Unit)).

The driving unit 250 may be a driving control signal generated by applying data related to the refrigerator to a neural network model in the AI processor 261. The driving control signal may be a signal received from the external AI device 20 through the communication unit 220.

The sensing unit 270 can sense a state of the refrigerator 100. The sensor 270 may include at least any one of a temperature sensor, a humidity sensor, an ultrasonic sensor, and an illumination sensor.

The AI processor 261 can generate state data of the refrigerator 100 by applying a neural network model to sensing data generated by at least one sensor. The AI processing data generated by applying the neural network model may include internal temperature data of the refrigerator 100, internal humidity data of the refrigerator 100, internal illumination data of the refrigerator 100, external temperature data of the refrigerator 100, external humidity data of the refrigerator 100, etc.

Meanwhile, the refrigerator 100 transmits sensing data acquired through at least one sensor to the AI device 20 through the communication unit 22 and the AI device 20 can transmit AI processing data generated by applying the neural network model 26 to the transmitted sensing data to the refrigerator 100.

In accordance with an embodiment, the AI processor 261 can perform deep learning calculation on the basis of a plurality of data sensed by the sensing unit 270, and can correct the internal temperature data of the refrigerator 100 on the basis of generated AI processing data.

The refrigerator 100 may include an internal communication system (not shown). The plurality of electronic devices included in the refrigerator 100 can exchange signals through the internal communication system 50. Data may be included in the signals. The internal communication system (not shown) can use at least one communication protocol (e.g., CAN, LIN, FlexRay, MOST or Ethernet).

The AI processor 261 can apply information about temperature received from at least one or more sensor disposed in the refrigerator 100 or an external device to a neural network model.

In the above, 5G communication for implementing a method of controlling an artificial intelligent refrigerator 100 according to an embodiment of the present disclosure and a rough configuration for performing AI processing and for transmitting the AI processing result by applying the 5G communication were described.

Hereafter, a detailed method of passively intervening or actively intervening in the internal state of the refrigerator 100 on the basis of state information of internal temperature of the artificial intelligent refrigerator 100 in accordance with an embodiment of the present disclosure is described with reference to required drawings.

Meanwhile, the artificial intelligent refrigerator according to the present disclosure may include a refrigeration cycle system, if necessary.

Figure 7:
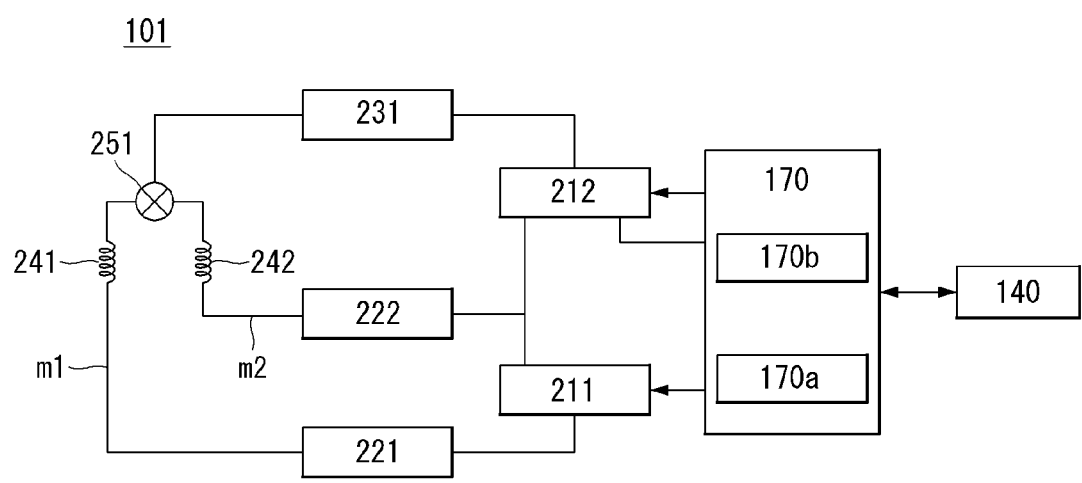
FIG. 7 is a diagram illustrating a refrigeration cycle system that is controlled by a processor according to an embodiment of the present disclosure.

FIG. 7 is a diagram illustrating a refrigeration cycle system that is controlled by a processor according to an embodiment of the present disclosure.

Though not shown, the artificial intelligent refrigerator 100 may have a machine room at the lower portion of the main body. A refrigeration cycle system 101 may be installed in the machine room.

Referring to FIG. 7, the processor 170 may be electrically connected with the refrigeration cycle system 101. The refrigeration cycle system 101 can generate cold air under control of the processor 170.

The refrigeration cycle system 101 may include compressing units 211 and 212, evaporating units 221 and 222, a condensing unit 231, and a refrigerant switch valve 251.

The compressing units 211 and 212 can compress a refrigerant. The compressing units 211 and 212 may include a first compressing unit 211 and a second compressing unit 212. The first compressing unit 211 and the second compressing unit 212 may be arranged in series. A discharge port of the first compressing unit 211 may be connected to an intake port of the second compressing unit 212.

The first compressing unit 211 and the second compressing unit 212 may be connected to compress a refrigerant in two steps. That is, a refrigerant can be primarily compressed through the first compressing unit 211 and then secondarily compressed through the second compressing unit 212.

The capacities of the first compressing unit 211 and the second compressing unit 212 may be designed to be the same, but common refrigerators operate the refrigerating compartment much, so the capacity of the second compressing unit 212 may be designed to be about twice larger than that of the first compressing unit 211.

The condensing unit 231 may be connected to a discharge port of the second compressing unit 212 positioned downstream in the flow direction of a refrigerant. An inlet of the condensing unit may be connected to the discharge port of the second compressing unit 212.

The evaporating units 221 and 222 may include: a first evaporating unit 221 diverging from the condensing unit 231 and connected to an intake port of the first compressing unit 211 positioned upstream in the flow direction of a refrigerant; and a second evaporating unit 222 diverging from the condensing unit 231 together with the first evaporating unit 221 and connected between the discharge port of the first compressing unit 211 and the intake port of the second compressing unit 212. The first evaporating unit 221 and the second evaporating unit 222 diverge from an outlet of the condensing unit 231 and connect to a first diverging pipe m1 and a second diverging pipe m2.

The first diverging pipe m1 may be disposed between the outlet of the condensing unit 231 and the first evaporating unit 221. The second diverging pipe m2 may be disposed between the outlet of the condensing unit 231 and the second evaporating unit 222.

The refrigerant switch valve 251 that controls the flow direction of a refrigerant may be installed at the diverging point of the first diverging pipe m1 and the second diverging pipe m2. The refrigerant switch valve 251 may be installed at a diverging point from the outlet of the condensing unit 231 to the first evaporating unit 221 and the second evaporating unit 222. The refrigerant switch valve 251 may be a 3-way valve. For example, the refrigerant switch valve 251 is formed in a structure enabling the outlet of the condensing unit 231 to selectively communicate with the first evaporating unit 221 or the second evaporating unit 222, or with both of the first evaporating unit 221 and the second evaporating unit 222, thereby being able to control the flow direction of a refrigerant.

Further, expanding units 241 and 242 that expand a refrigerant may be included between the refrigerant switch valve 251 and the first and second evaporating unit 221 and 222. The expanding units 241 and 242 may include a first expanding unit 241 disposed between the refrigerant switch valve 251 and the first evaporating unit 221, and a second expanding unit 242 disposed between the refrigerant switch valve 251 and the second evaporating unit 222.

The processor 170 may include a first controller 170a that calculates a variation of refrigerating compartment temperature at every time period and a second controller 170b that calculates a variation of freezing compartment temperature at every time period. The first controller 170a may be referred to as a first calculator and the second controller 170b may be referred to as a second calculator.

For example, the first controller 170a can control the first compressing unit 211. The second controller 170b can control the second compressing unit 212.

The refrigeration cycle system 101 described above can be operated under control of the processor 170.

The operation mode of the artificial intelligent refrigerator 100 can select the flow direction of a refrigerant to the first compressing unit 211 or the second compressing unit 212, using the refrigerant switch valve 251 under control of the processor 170. Accordingly, the operation mode of the refrigerator may include a simultaneous operation mode that simultaneously operates the refrigerating compartment and the freezing compartment, a freezing compartment operation mode that operates only the freezing compartment, or a refrigerating compartment operation mode that operates only the refrigerating compartment.

For example, when the operation mode of the refrigerator is the simultaneous operation mode, the processor 170 can control the refrigerant switch valve 251 to open the first diverging pipe m1 connected to the first evaporating unit 221 and open the second diverging pipe m2 connected to the second evaporating unit 222. Accordingly, the refrigerant switch valve 251 can distribute the refrigerant passing through the condensing unit 231 to the first evaporating unit 221 and the second evaporating unit 222. Further, the first compressing unit 211 and the second compressing unit 212 can be both operated under control of the processor.

A refrigerant can be suctioned into the first compressing unit 211 through the first evaporating unit 221, primarily compressed through the first compressing unit 211, and then discharged as a primarily compressed refrigerant. The primarily compressed refrigerant discharged from the first compressing unit 211 can be suctioned into the second compressing unit 212.

In this case, the refrigerant passing through the second evaporating unit 222 can be mixed with the primarily compressed refrigerant discharged from the first compressing unit 211 and then suctioned into the second compressing unit 212.

The primarily compressed refrigerant and the refrigerant that has passed through the second evaporating unit 222 can be compressed and discharged through the second compressing unit 212. The refrigerant discharged from the second compressing unit 212 can be moved to and condensed through the condensing unit 231. The refrigerant condensed through the condensing unit 231 repeats the successive process of being distributed and circulated to the first evaporating unit 221 and the second evaporating unit 222 through the refrigerant switch valve 251.

Further, when the operation mode of the refrigerator is the freezing compartment operation, the processor 170 can control the refrigerant switch valve 251 to open the first diverging pipe m1 connected to the first evaporating unit 221 and close the second diverging pipe m2 connected to the second evaporating unit 222. Accordingly, the refrigerant switch valve 251 can control the refrigerant passing through the condensing unit 231 to circulate to the first evaporating unit 221.

In this case, the first compressing unit 211 and the second compressing unit 212 can be both operated under control of the processor. The processor 170 controls the first compressing unit 211 and the second compressing unit 212 to simultaneously operate, thereby being able to secondarily compress and circulate the refrigerant that has passed through the first evaporating unit 221 sequentially through the first compressing unit 211 and the second compressing unit 212.

Further, when the operation mode of the refrigerator is the refrigerating compartment operation, the processor 170 can control the refrigerant switch valve 251 to close the first diverging pipe m1 connected to the first evaporating unit 221 and open the second diverging pipe m2 connected to the second evaporating unit 222. Accordingly, the refrigerant switch valve 251 can control the refrigerant passing through the condensing unit 231 to circulate to the second evaporating unit 222.

In this case, the processor 170 can perform control such that the first compressing unit 211 stops and only the second compressing unit 212 operates.

The processor 170 can control the refrigerant that has passed through the condensing unit 231 to be moved only to the second evaporating unit 222 and suctioned into the second compressing unit 212. The processor 170 can control a successive process of moving the refrigerant that has compressed by the second compressing unit 212 back to the condensing unit 231 to condense the refrigerant is continuously repeated.

As described above, the processor 170 controls the refrigerator to operate in an independent refrigeration cycle in correspondence to the load of the freezing compartment or the refrigerating compartment, thereby reducing unnecessary power consumption by the refrigerator and accordingly considerably increasing efficiency of the refrigerator.

In initial starting, when a variation of refrigerating compartment temperature or a variation of freezing compartment temperature is a pre-set reference variation or more, the processor 170 can maintain the current cooling ability value of the first compressing unit 211 or the second compressing unit 212.

Further, in initial starting, when a variation of refrigerating compartment temperature or a variation of freezing compartment temperature is the reference variation or less, the processor 170 can decrease the current cooling ability value of the first compressing unit 211 or the second compressing unit 212.

The processor 170 compares variations of the refrigerating compartment temperature calculated at every time period or compares variations of the freezing compartment temperature calculated at every time period, and when the variations increase, the processor 170 can perform a load correspondence operation.

The refrigeration cycle system 101 was described above as including the first compressing unit 211 and the second compressing unit 212, but it is not limited thereto and may be composed of one compressing unit 211 and 212.

Figure 8:
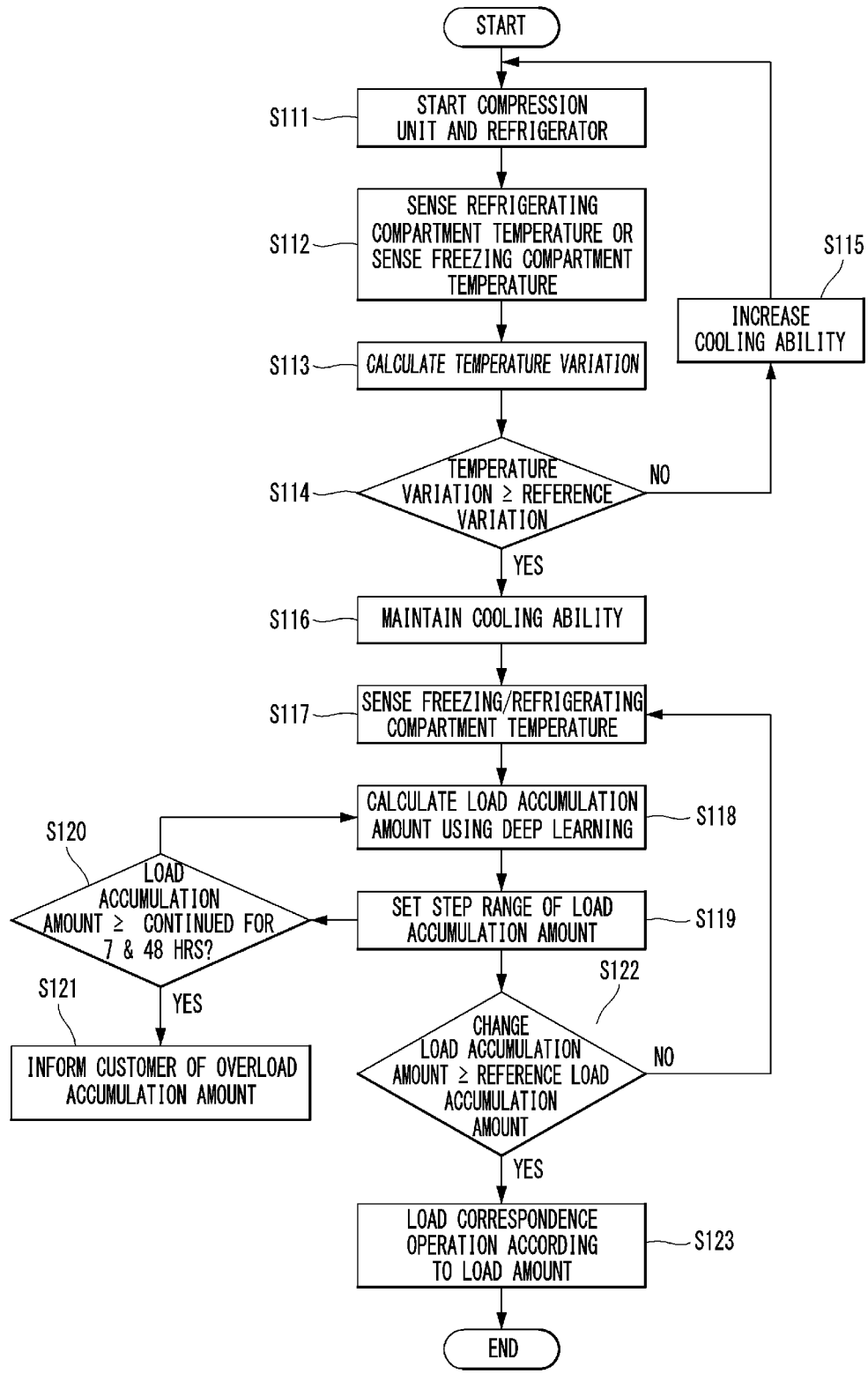
FIG. 8 is a flowchart illustrating a method of controlling an artificial intelligent refrigerator according to an embodiment of the present disclosure.

FIG. 8 is a flowchart illustrating a method of controlling an artificial intelligent refrigerator according to an embodiment of the present disclosure.

Referring to FIG. 8, a method of controlling an artificial intelligent refrigerator according to an embodiment of the present disclosure may include: an initial driving step of changing a cooling ability of a compressing unit on the basis of a variation of refrigerating compartment temperature or a variation of freezing compartment temperature after an initial starting; a variation calculating step of calculating a variation of refrigerating compartment-internal temperature or a variation of freezing compartment-internal temperature at every predetermined time period; and a load accumulation amount determining step of determining a load accumulation amount in accordance with the refrigerating compartment-internal temperature, the freezing compartment-internal temperature, surrounding temperature/humidity of the refrigerator, and an operation state of the refrigerator. Hereafter, FIGS. 4 to 7 are referred to for the configuration of the apparatus. The artificial intelligent refrigerator may be referred to as a refrigerator.

The initial driving step can maintain the current cooling ability value of the compressing unit through the processor when a variation of refrigerating compartment temperature or a variation of freezing compartment temperature is a pre-set reference variation or more, and can increase the cooling ability value of the compressing unit when a variation of the refrigerating compartment-internal temperature or a variation of the freezing compartment-internal temperature is less than the reference variation.

When a user, etc. applies power to the compressing unit and the refrigerator, the compressing unit and the refrigerator can be started or operated (S111). The artificial intelligent refrigerator, in initial starting, can sense the internal temperature of the refrigerating compartment and can sense the internal temperature of the freezing compartment (S112).

The calculating step can calculate a variation of the refrigerating compartment-internal temperature or a variation of the freezing compartment-internal temperature on the basis of the sensed internal temperature of the refrigerating compartment or internal temperature of the freezing compartment (S113). The processor compares the calculated variation of the refrigerating compartment-internal temperature or variation of the freezing compartment-internal temperature with a pre-set reference variation (S114), and can maintain the current cooling ability value of the compressing unit when the variation is the reference variation or more (S116).

Further, when the calculated variation of the refrigerating compartment-internal temperature or variation of the freezing compartment-internal temperature is the reference variation of less (S114), the processor can increase the current cooling ability value of the compressing unit (S115). That is, the artificial intelligent refrigerator can control the cooling ability value of the compressing unit while comparing variations of the refrigerating compartment-internal temperature calculated at every predetermined time period or comparing variations of the freezing compartment-internal temperature calculated at every predetermined time period.

In the load accumulation amount determining step, the artificial intelligent refrigerator can continuously sense the refrigerating compartment-internal temperature and the freezing compartment-internal temperature, with the current cooling ability value of the compressing unit maintained (S117).

The artificial intelligent refrigerator can determine or estimate a load accumulation amount by learning external air temperature/humidity of the refrigerator and the operation state of the refrigerator, in addition to the variation of the refrigerating compartment-internal temperature and the variation of the freezing compartment-internal temperature, using the processor (S118). The load accumulation amount does not mean the ratio of food or foodstuffs put in the refrigerator, but means being added with a thermal load required for cooling based on the thermal capacity of food or foodstuffs or an external air environment condition.

That is, the artificial intelligent refrigerator can calculate a load accumulation amount by learning a variation of the refrigerating compartment-internal temperature, a variation of the freezing compartment-internal temperature, external air temperature/humidity of the refrigerator, and the operation state of the refrigerator and can set a step range of the calculated load accumulation amount under control of the processor (S119).

The processor can calculate a changed load accumulation amount on the basis of the calculated load accumulation amount and the initial load accumulation amount (S122). The processor can compare the changed load accumulation amount with a reference load accumulation amount. The reference load accumulation amount may be substantially 60% or less of the load accumulation amount. When the changed load accumulation amount is the reference load accumulation amount or more, the processor can perform a load correspondence operation in accordance with a load amount (S123).

Further, when the load accumulation amount comes out of the set step range of the load accumulation amount (S120), the processor can inform a customer of an overload accumulation amount (S121). When the load accumulation amount continues from set 7 hours to 48 hours, the processor can generate a notice signal giving a notice that an overload accumulation amount has been generated. The processor can transmit the generated notice signal to a smart device or a mobile phone of a customer using a communication unit.

Figure 9:
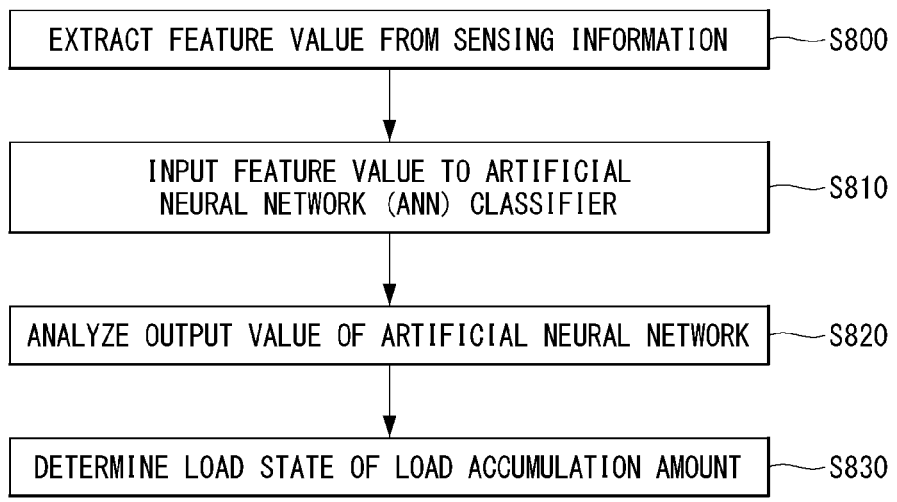
FIG. 9 is a diagram illustrating an example of calculating a load accumulation amount in an embodiment of the present disclosure.

FIG. 9 is a diagram illustrating an example of calculating a load accumulation amount in an embodiment of the present disclosure.

Referring to FIG. 9, the processor can extract feature values from sensing information obtained through at least one sensor in order to calculate a corresponding load accumulation amount when food is loaded in the refrigerator (S800).

For example, the processor can receive temperature information from at least one sensor (e.g., a temperature sensor). The processor 170 can extract a feature value from the temperature information. The feature value is calculated as a value indicated in detail through temperature of food measured when the food is put into the refrigerator, internal temperature of the refrigerator, surrounding temperature/humidity of the refrigerator, or at least one feature that can be extracted from the temperature information.

The processor can control the feature values to be input to an artificial neural network (ANN) classifier trained to discriminate load accumulation amounts for food (S810).

The processor 170 can generate a load state for the load accumulation amount by combining the extracted feature value. The load state for the load accumulation amount can be input to an artificial neural network (ANN) classifier trained to discriminate an overload state of the load accumulation amount on the basis of the extracted feature value.

The processor 170 can analyze an output value of the artificial neural network (S820) and can determine the load state of the load accumulation amount on the basis of the output value of the artificial neural network (S830).

The processor 170 can determine whether the load accumulation amount is overload or not, from the output value of the artificial neural network classifier.

On the other hand, although an example in which the operation of determining an overload state of a load accumulation amount through AI processing is implemented in processing of the refrigerator was described with reference to FIG. 9, the present disclosure is not limited thereto. For example, AI processing may be performed on a 5G network on the basis of sensing information received from the artificial intelligent refrigerator.

Figure 10:
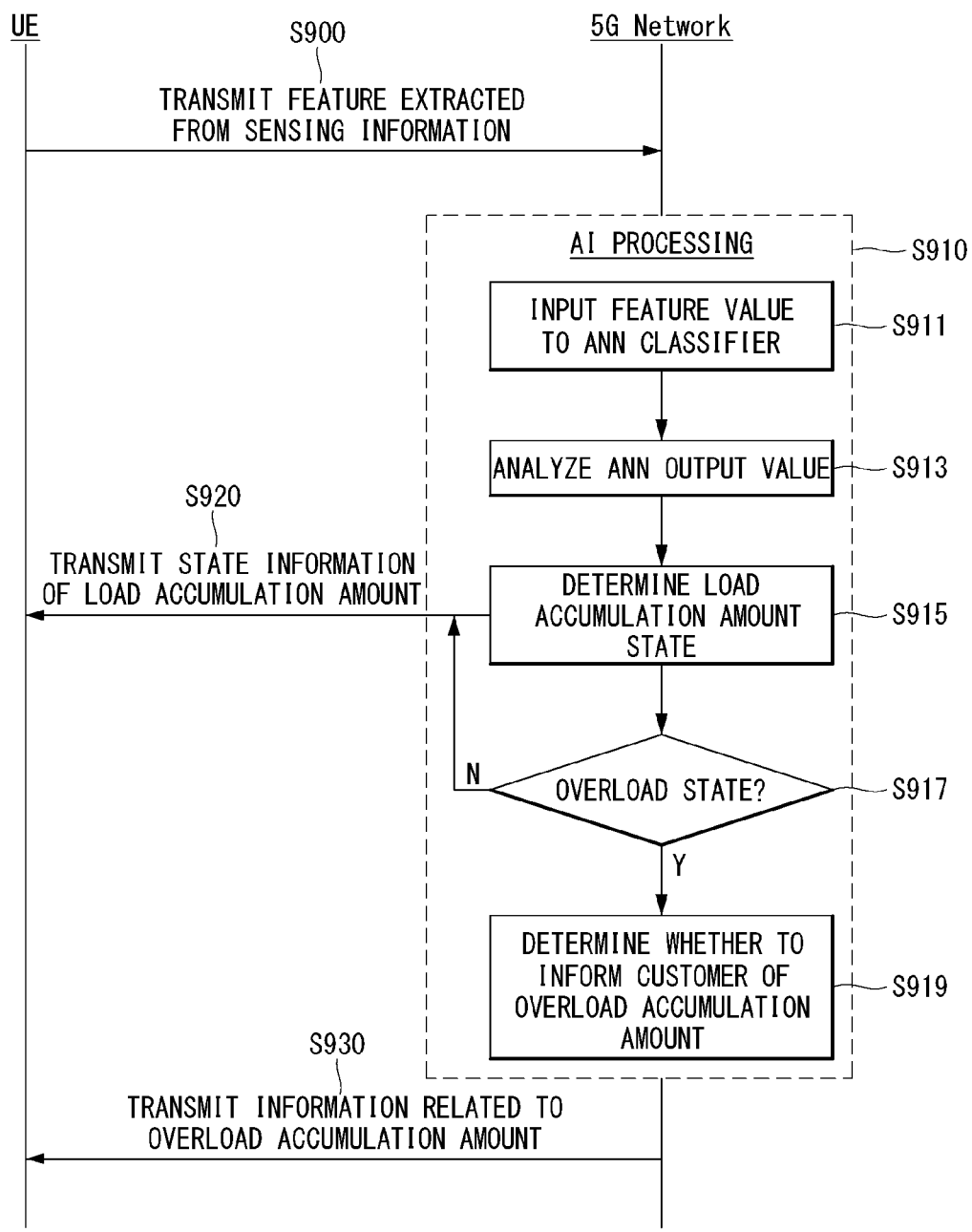
FIG. 10 is a diagram illustrating another embodiment of determining an overload state of a load accumulation amount in an embodiment of the present disclosure.

FIG. 10 is a diagram illustrating another embodiment of determining an overload state of a load accumulation amount in an embodiment of the present disclosure.

The processor 170 can control a communication unit to transmit the sensing information of the load accumulation amount to an AI processor included in a 5G network.

Further, the processor 170 can control the communication unit to receive AI-processed information from the AI processor.

The AI-processed information may information obtained by determining whether the state of a load accumulation amount is overload or not.

Meanwhile, the artificial intelligent refrigerator can perform a procedure for initial connection with the 5G network to transmit the state information of a load accumulation amount to the 5G network. The artificial intelligent refrigerator can perform the procedure for initial connection with the 5G network on the basis of an SSB (Synchronization signal block).

Further, the artificial intelligent refrigerator can receive DCI (Downlink Control Information), which is used to schedule transmission of state information of a load accumulation amount that is acquired from at least one sensor disposed in the artificial intelligent refrigerator through wireless communication unit, from a network.

The processor 170 can transmit the state information of the load accumulation amount to the network on the basis of the DCI.

The state information of the load accumulation amount is transmitted to the network through a PUSCH, and DM-RS of the SSB and the PUSCH can undergo QCL for a QCL type D.

Referring to FIG. 10, the artificial intelligent refrigerator can transmit a feature value extracted from sensing information to the 5G network (S900).

Here, the 5G network may include an AI processor or an AI system and the AI system of the 5G network can perform AI processing on the basis of received sensing information (S810).

The AI system can input feature values received from the artificial intelligent refrigerator to an ANN classifier (S911). The AI system can analyze an ANN output value (S913) and can determine the state of the load accumulation amount from the ANN output value (S915). The 5G network can transmit state information of the load accumulation amount determined by the AI system to the artificial intelligent refrigerator through the wireless communication unit.

In this case, the state information of the load accumulation amount may include whether it is an overload state or not, etc.

The AI system, when determining that the load accumulation amount is an overload state (S917), can control the artificial intelligent refrigerator to operate with the maximum cooling ability when a tolerance is exceeded. This will be described in detail below.

When the load accumulation amount is an overload state, the AI system can determine to transmit a notice signal to a customer (S919). Further, the AI system can transmit information (or a signal) related to the notice signal to the artificial intelligent refrigerator.

Meanwhile, the artificial intelligent refrigerator may transmit only the sensing information to the 5G network and may extract a feature value corresponding to overload detection input that will be used as input of an artificial neural network for determining an overload state of the load accumulation amount from the sensing information in the AI system included in the 5G network.

Figure 11:
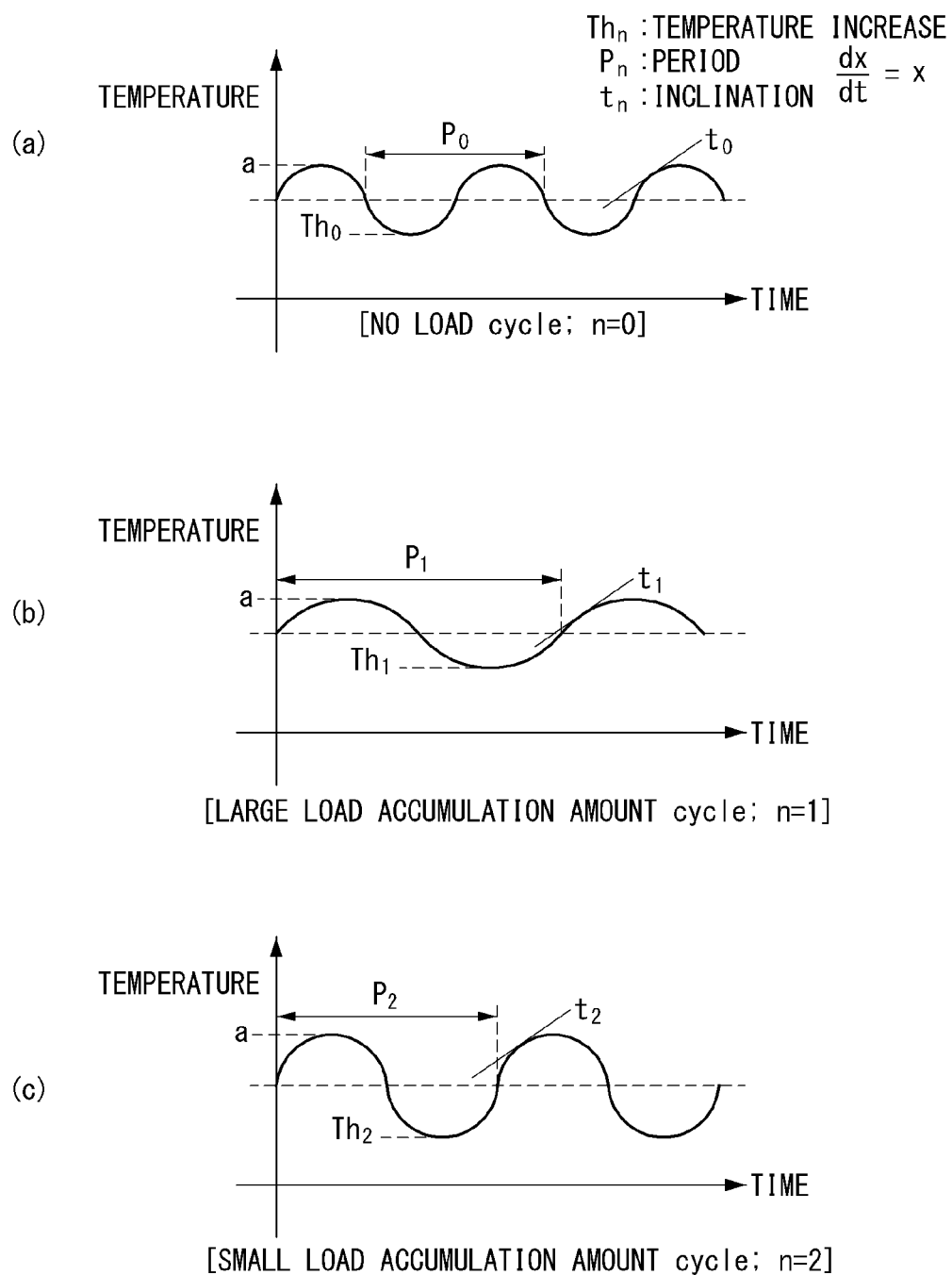
FIGS. 11 and 12 show a graph related to a load accumulation amount and learning the load accumulation amount in accordance with an embodiment of the present disclosure.
Figure 12:
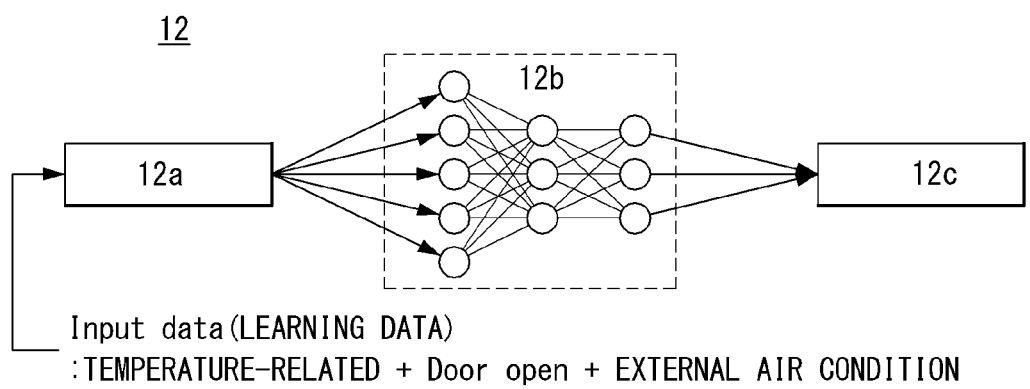

FIGS. 11 to 12 show a graph related to a load accumulation amount and learning the load accumulation amount in accordance with an embodiment of the present disclosure.

Referring to FIGS. 11 and 12, the artificial intelligent refrigerator can estimate an internal load amount through a rising inclination from the relationship between temperature and a compressing unit.

Referring to FIG. 11, the up-down direction of the graph may show temperature and the left-right direction in the graph may show time. The cooling ability output from a compressing unit may be substantially the same.

As shown in (a) of FIG. 11, when there is no load, a target temperature of a refrigerator may be set as Th0. a may be limit temperature of the refrigerator. For example, the target temperature of the refrigerator may be set as 3 degrees and the target temperature of a freezing compartment may be set as −15 degrees. The limit temperature of a refrigerating compartment may be 10 degrees or more.

P0 may be time required for reaching the target temperature of the refrigerator in accordance with a load accumulation amount. In the graph shown in FIG. 11, the compressing unit may operate when the inclination is a minus value, and may not operate when the inclination is a plus value. For example, the compressing unit can operate until the target temperature of the refrigerator is reached. The compressing unit can stop operating when the target temperature of the refrigerator is reached. The compressing unit can keep stopping operation until a set limit temperature of the refrigerator is reached.

t0 may be a variation of time required for reaching the target temperature of the refrigerator.

As shown in (b) of FIG. 11, when a load accumulation amount is large, the compressor can operate longer than when there is no load so that the target temperature of the refrigerator is reached. Accordingly, P1 can become longer than P2 and t1 can become lower than t0.

As shown in (c) of FIG. 11, when a load accumulation amount is small, the compressor can operate longer than when there is not load and shorter when the load accumulation amount is large so that the target temperature of the refrigerator is reached. Accordingly, P2 can be longer than P0 and shorter than P1. Further, t2 can be lower than t0 and higher than t1.

As shown in FIG. 11, the artificial intelligent refrigerator may estimate an external load permeation amount by comparing the dropping inclination through a comp-operation of the same cooling ability on the basis of the previous rising inclination. The comp may be referred to as a compressing unit or a compressor.

For example, when the inclination rising after the compression units 211 and 212 are turned off and the inclination dropping after the compression units 211 and 212 are turned on are substantially the same, the processor can estimate that the freshness of storing food is excellent. In other words, when the inclination rising after the compression units 211 and 212 are turned off and the inclination dropping after the compression units 211 and 212 are turned on are substantially the same, the energy efficiency can be increased.

A feature value related to the internal temperature of a refrigerator was described in reference to FIG. 11, but the present disclosure is not limited thereto, and when considering an open state of a refrigerator door, an external air condition around the refrigerator, etc. in addition to the temperature-related information, it is possible to find out more accurate external load permeation amount and it is also possible to estimate an internal load amount.

FIG. 12 is a diagram illustrating learning through a data learning unit according to an embodiment of the present disclosure.

Referring to FIG. 12, an artificial intelligent processor 170 may include a data learning unit 12.

The data learning unit 12 can learn references about what learning data are used and how to classify and recognize data using the learning data in order to determine data classification/recognition. The data learning unit 12 can learn a deep learning model by acquiring learning data to be used for learning and by applying the acquired learning data to the deep learning model.

The data learning unit 12 may include a data collection unit 12a that collects various learning data, a learning unit 12b that deep learns the collected data, and an output unit 12c that outputs the learned data.

The data collection unit 12a can collect data contents (the number of operation times of refrigerator doors, open time of doors, etc.) related to a variation of internal temperature of a refrigerator, temperature around a refrigerator, refrigerator doors.

The learning unit 12b can learn contents that can control a load accumulation amount by learning the collected data contents (the number of operation times of refrigerator doors, open time of doors, etc.) related to a variation of internal temperature of a refrigerator, temperature around a refrigerator, refrigerator doors. A learned mode was described in detail above, so it is omitted.

The output unit 12c can propose a result learned on the basis of the learned model under control of the learning unit 12b.

FIG. 13 shows setting a load accumulation amount step range according to an embodiment of the present disclosure.

Referring to FIG. 13, a load accumulation amount step range may be divided into a step 1 to a step 10. An artificial intelligent refrigerator can operate with the maximum cooling ability when a tolerance is exceeded.

The step 1 is a case when a load change accumulation amount is less than 10%, the step 2 is a case when a load change accumulation amount is 20%, the step 3 is a case when a load change accumulation amount is 30%, the step 4 is a case when a load change accumulation amount is 40%, the step 5 is a case when a load change accumulation amount is 50%, the step 6 is a case when a load change accumulation amount is 60%, the step 7 is a case when a load change accumulation amount is 70%, the step 8 is a case when a load change accumulation amount is 80%, the step 9 is a case when a load change accumulation amount is 90%, and the step 10 is a case when a load change accumulation amount is 100%.

External temperature may be set on the basis of a case when it is about 5 degrees to 43 degrees.

Further, the processor can use a load correspondence cooling ability and a fan.

For example, the load correspondence cooling ability may use about 90% of a basic cooling ability from the step 1 to the step 3, and the fan may have a medium speed.

Further, the load correspondence cooling ability may use about 100% of the basic cooling ability from the step 4 to the step 6, and the fan may have a medium speed. Further, the load correspondence cooling ability may use about 105% of the basic cooling ability from the step 7 to the step 8, and the fan may have a medium speed. The load correspondence cooling ability may use about 110% of the basic cooling ability from the step 9 to the step 10, and the fan may have a high speed.

The basic cooling ability may be operated on the basis of a cooling ability-variable map according to a control temperature and an external air condition.

As described above, an artificial intelligent refrigerator according to an embodiment of the present disclosure and a method of controlling the artificial intelligent refrigerator can operate a refrigerator not while measuring a load amount when a door of the artificial intelligent refrigerator is opened and food is put therein, but always in the same pattern. Accordingly, the present disclosure can prevent noise and a waste of energy from being generated due to frequent input of load correspondence. Further, it is possible to analyze and learning a change of a refrigerating sensor through deep learning, and then more accurately estimate a load amount. It is possible to operate the refrigerator in an optimal condition in accordance with the estimated load amount.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

Effects of an artificial intelligent refrigerator according to the present disclosure are described hereafter.

Further, the present disclosure can improve energy efficiency by estimating a variation of refrigerating compartment temperature or a variation of freezing compartment temperature in accordance with an artificial intelligent learning result, and performing a load correspondence operation on the basis of the estimation.

Further, the present disclosure can reduce power consumption by estimating a variation of refrigerating compartment temperature or a variation of freezing compartment temperature in accordance with an artificial intelligent learning result, and performing a load correspondence operation on the basis of the estimation.

Further, the present disclosure can improve system stability and operation efficiency by estimating a variation of refrigerating compartment temperature or a variation of freezing compartment temperature in accordance with an artificial intelligent learning result, and performing a load correspondence operation on the basis of the estimation.

What is claimed is:

1. An artificial intelligent refrigerator comprising:
a first temperature sensor configured to sense a first temperature of a refrigerating compartment;
a second temperature sensor configured to sense a second temperature of a freezing compartment; and
a processor configured to:
calculate a load accumulation amount of items stored in the refrigerating compartment and the freezing compartment based on at least one of the first temperature or the second temperature; and
perform an operation corresponding to a load using the calculated load accumulation amount, wherein the processor is further configured to:
calculate the load accumulation amount by learning a variation of the first temperature, a variation of the second temperature, at least one of an external air temperature or humidity of the artificial intelligent refrigerator, and an operation state of the artificial intelligent refrigerator;
set a step range of the calculated load accumulation amount, the step range being a percentage of an amount of change in load accumulation divided into control responses at a stepped basis;
change a cooling ability value of load correspondence according to the set step range of the calculated load accumulation amount; and
generate a notice signal that an overload accumulation amount has been generated based on the load accumulation amount being out of the set step range of the load accumulation amount and being maintained for a set time,
wherein the step range includes a plurality of groups using different cooling abilities, each group of the plurality of groups includes a plurality of steps using the same cooling ability, and at least two groups among the plurality of groups that use the different cooling abilities use a same fan speed.

2. The artificial intelligent refrigerator of claim 1, further comprising:
a first compressor and a second compressor that are coupled and configured to compress a refrigerant;
a condenser coupled to a discharge side of the second compressor positioned downstream in a flow direction of the refrigerant;
a first evaporator diverging from the condenser and coupled to an intake side of the first compressor positioned upstream in the flow direction of the refrigerant;
a second evaporator diverging from the condenser and coupled to a connecting portion between a discharge side of the first compressor and an intake side of the second compressor; and
a refrigerant switch valve located at a point diverting from an outlet side of the condenser to the first evaporator and the second evaporator, and configured to control the flow direction of the refrigerant.

3. The artificial intelligent refrigerator of claim 1, wherein the processor comprises:
a first calculator configured to calculate a variation of the first temperature periodically; and
a second calculator configured to calculate a variation of the second temperature periodically.

4. The artificial intelligent refrigerator of claim 1, further comprising a memory configured to store a variation of the first temperature and a variation of the second temperature.

5. The artificial intelligent refrigerator of claim 2, wherein the processor is further configured to maintain a current cooling ability value of the first and second compressors when a variation of the first temperature or a variation of the second temperature is equal to or greater than a pre-set reference variation.

6. The artificial intelligent refrigerator of claim 2, wherein the processor is further configured to increase a current cooling ability value of the first and second compressors when a variation of the first temperature or a variation of the second temperature is equal to or less than a pre-set reference variation.

7. The artificial intelligent refrigerator of claim 1, wherein a thermal capacity of food or a thermal load required for cooling based on an external air environment condition is added to the load accumulation amount.

8. The artificial intelligent refrigerator of claim 1, wherein the processor is further configured to:
receive a Downlink Control Information (DCI), which is used to schedule transmission of temperature information sensed by the artificial intelligent refrigerator, from a network; and
transmit the sensed temperature information to the network based on the DCI.

9. The artificial intelligent refrigerator of claim 8, wherein the processor is further configured to:
perform a procedure of initial connection with the network based on a Synchronization signal block (SSB); and
transmit the sensed temperature information to the network through a physical uplink shared channel (PUSCH), and
wherein demodulation reference signals (DM-RS) of the SSB and the PUSCH has undergone quasi co-located (QCLed) for a QCL type D.

10. The artificial intelligent refrigerator of claim 8, wherein the network comprises a 5G network.

11. The artificial intelligent refrigerator of claim 8, wherein the step range includes steps 1 to 10 in which a load change accumulation amount is sequentially increased by 10% from 0% to 100%, and
wherein the processor is further configured to:
in the step 1 to the step 3, use a load correspondence cooling ability corresponding to 90% of a basic cooling ability and drive a fan at a first speed,
in the step 4 to the step 6, use a load correspondence cooling ability corresponding to 100% of the basic cooling ability and drive the fan at the first speed,
in the step 7 to the step 8, use a load correspondence cooling ability corresponding to 105% of the basic cooling ability and drive the fan at the first speed, and
in the step 9 to the step 10, use a load correspondence cooling ability corresponding to 110% of the basic cooling ability and drive the fan at a second speed higher that the first speed.

* * * * *